United States Patent
Statica et al.

(10) Patent No.: US 10,320,560 B1
(45) Date of Patent: **\*Jun. 11, 2019**

(54) KEY MANAGEMENT AND DYNAMIC PERFECT FORWARD SECRECY

(71) Applicant: Wickr Inc., San Francisco, CA (US)

(72) Inventors: Robert Statica, Long Valley, NJ (US); Christopher A. Howell, Freehold, NJ (US)

(73) Assignee: Wickr Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/387,595

(22) Filed: Dec. 21, 2016

Related U.S. Application Data

(63) Continuation of application No. 15/240,989, filed on Aug. 18, 2016, which is a continuation of application No. 14/213,736, filed on Mar. 14, 2014, now Pat. No. 9,698,976.

(60) Provisional application No. 61/943,826, filed on Feb. 24, 2014.

(51) Int. Cl.
   *H04L 9/00* (2006.01)
   *H04L 9/08* (2006.01)
   *H04L 9/30* (2006.01)

(52) U.S. Cl.
   CPC .............. *H04L 9/083* (2013.01); *H04L 9/30* (2013.01); *H04L 2209/24* (2013.01)

(58) Field of Classification Search
   None
   See application file for complete search history.

(56) References Cited

U.S. PATENT DOCUMENTS

| 7,421,079 | B2 | 9/2008 | Freeman et al. |
| 7,548,621 | B1 | 6/2009 | Smith et al. |
| 2003/0037250 | A1 | 2/2003 | Walker et al. |
| 2003/0097561 | A1 | 5/2003 | Wheeler et al. |
| 2003/0147536 | A1 | 8/2003 | Andivahis et al. |
| 2003/0163701 | A1 | 8/2003 | Ochi et al. |
| 2003/0204738 | A1 | 10/2003 | Morgan |
| 2004/0025057 | A1 | 2/2004 | Cook |
| 2004/0068647 | A1 | 4/2004 | Hariharan et al. |
| 2004/0107349 | A1 | 6/2004 | Sasselli et al. |
| 2005/0125659 | A1 | 6/2005 | Sarfati et al. |
| 2005/0156708 | A1 | 7/2005 | Puranik et al. |
| 2005/0262338 | A1 | 11/2005 | Irwin |
| 2006/0018473 | A1 | 1/2006 | Hori |
| 2007/0116269 | A1 | 5/2007 | Nochta |
| 2008/0095371 | A1 | 4/2008 | Vataja |
| 2008/0304364 | A1 | 12/2008 | Holtzman et al. |
| 2009/0154705 | A1 | 6/2009 | Price et al. |

(Continued)

OTHER PUBLICATIONS

Author Unknown, "Perfect Forward Secrecy", IBM Security Site Protector System, http://pic.dhe.ibm.com/infocenter/sprotect/v2r8m0/index.jsp?topic- =%2Fcom.ibm.siteprotector.doc%2Freferences%2Fsp.sub.--agenthelp.sub.--perf-ect.sub.--forward_sub.--secrecy.htm.

(Continued)

*Primary Examiner* — Samson B Lemma
(74) *Attorney, Agent, or Firm* — LaForgia Law, P.C.

(57) ABSTRACT

An indication is received from a server that a first pool of public keys should be transmitted to a server. At least one public-private keypair is generated in response to the received indication. The public key portion of the generated keypair is transmitted to the server. A subsequent indication is received from the server that an additional public key should be transmitted to the server.

19 Claims, 15 Drawing Sheets

(56) References Cited

U.S. PATENT DOCUMENTS

| | | |
|---|---|---|
| 2009/0222668 A1 | 9/2009 | Zaccone et al. |
| 2009/0316897 A1 | 12/2009 | Kambayashi et al. |
| 2011/0235806 A1 | 9/2011 | Fukuda |
| 2012/0150921 A1 | 6/2012 | Yamakawa |
| 2012/0284805 A1 | 11/2012 | Katsikas |
| 2014/0169564 A1 | 6/2014 | Gautama et al. |

OTHER PUBLICATIONS

Author Unknown, "Threema Cryptography Whitepaper" Threema, Mar. 9, 2015.

Cremers et al. "One-Round Strongly Secure Key Exchange with Perfect Forward Secrecy and Deniability" IACR Cryptology ePrint Archive, version 3, 2011.

Sharma et al. "Prevention of Traffic Analysis Attack in Friend in the Middle using Dummy Traffic Approach," IEEE International Conference on Computational Intelligence and Computing Research, Dec. 2013, http://ieeexplore.ieee.org/stamp/stamp.jsp?arnumber=6724131.

Toorani et al. "SSMS—A Secure SMS Messaging Protocol for the M-Payment Systems," Proceedings of the 13th IEEE Symposium on Computers and Communications, IEEE, Jul. 2008.

US 10,320,560 B1

KEY MANAGEMENT AND DYNAMIC PERFECT FORWARD SECRECY

CROSS REFERENCE TO OTHER APPLICATIONS

This application is a continuation of co-pending U.S. patent application Ser. No. 15/240,989, entitled KEY MANAGEMENT AND DYNAMIC PERFECT FORWARD SECRECY filed Aug. 18, 2016 which is incorporated herein by reference for all purposes, which is a continuation of co-pending U.S. patent application Ser. No. 14/213,736, entitled KEY MANAGEMENT AND DYNAMIC PERFECT FORWARD SECRECY filed Mar. 14, 2014 which is incorporated herein by reference for all purposes, which claims priority to U.S. Provisional Patent Application No. 61/943,826 entitled ENHANCED PERFECT FORWARD SECRECY FOR MULTI-SYNCHRONOUS COMMUNICATION filed Feb. 24, 2014 which is also incorporated herein by reference for all purposes.

BACKGROUND OF THE INVENTION

Users of electronic devices increasingly desire to communicate privately and securely with one another. Unfortunately, existing approaches to securing communications can be difficult and/or cumbersome to use. As one example, some approaches to data security make use of digital certificates or keys, or pre-shared passwords, which can be tedious to manage. Further, existing approaches are often susceptible to interception (e.g., eavesdropping and man-in-the middle attacks), forensic analysis, and impersonation.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
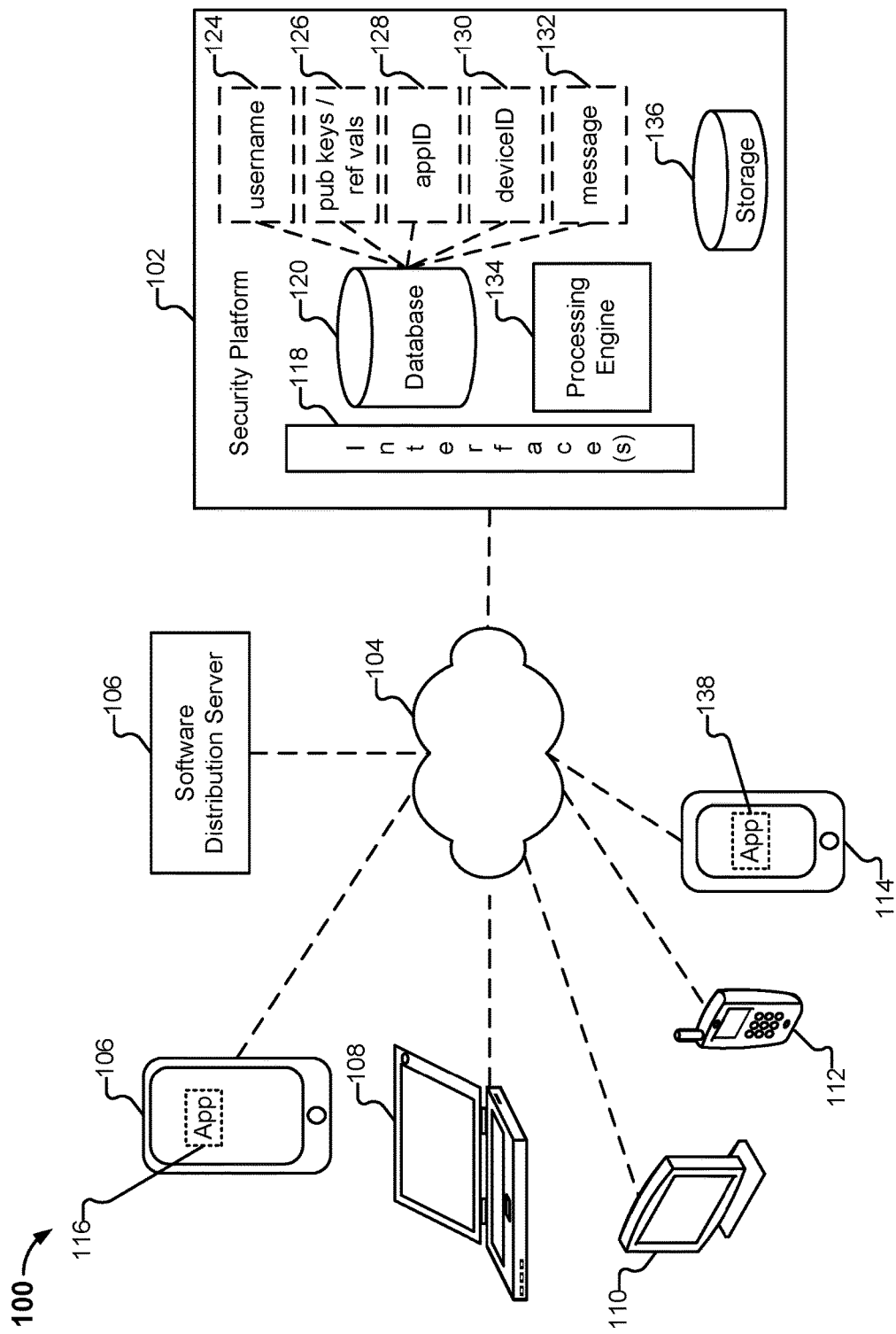
FIG. 1 illustrates an embodiment of an environment in which the exchange of secure communications is facilitated by a security platform.

FIG. 1 illustrates an embodiment of an environment in which the exchange of secure communications is facilitated by a security platform (e.g., security platform 102). In the environment shown in FIG. 1, a "digital security bubble" (DSB), described in more detail below, encapsulates or is otherwise provided around a message. The DSB allows information such as encryption information, hardware binding information, message security controls, and decryption information—for multiple recipients—to securely travel with the message. Further, the DSB provides cross-platform support. For example, techniques described herein can be deployed on a variety of operating systems (e.g., Linux, iOS, and Windows), on a variety of smart phone platforms (e.g., iPhone, Android, Windows, Blackberry, etc.), and on a variety of device types (e.g., mobile smart phones, tablets, laptops, desktops, etc.). Using techniques described herein, only intended accounts on intended devices are able to decrypt the messages. Thus, for example, the security platform is unable to decrypt messages. As will be described in more detail below, using the techniques described herein, message participants can maintain a forward secret secure messaging channel, whether communicating synchronously (e.g., where all participants are online or otherwise able to communicate with platform 102) and asynchronously (e.g., where at least one participant is offline or otherwise not in communication with platform 102).

Users of client devices, such as client devices 106-114 communicate securely with one another using techniques described herein. As shown in FIG. 1, client devices include personal computers (110), laptop computers (108), tablets (106), and mobile telephony devices (112, 114). Some client devices, e.g., tablet device 106, make use of techniques described herein via a messaging application (also referred to as an "app") obtained from a software distribution server 106. Examples of software distribution servers (which can comprise a single server or multiple servers working in cooperation) include app stores (e.g., provided by Apple, Google, Blackberry, Microsoft, Amazon, and/or other entities) and other webservers offering app downloads. Client devices can also make use of a web interface (e.g., provided by platform 102) instead of or in addition to a dedicated messaging application installed on the device. Other types of devices not depicted in FIG. 1 can also be used in conjunction with the techniques described herein, such as game consoles, video players (e.g., incorporating DVD, Blu-ray, Red Laser, Optical, and/or streaming technologies) and other network-connected appliances, as applicable.

Communications are exchanged via one or more networks (depicted collectively in FIG. 1 as network cloud 104). Such networks can include wired, wireless, cellular, and satellite networks. And, such networks can be closed/private networks, as well open networks (e.g., the Internet). Further, as used herein, "communications" and "messages" can take a variety of forms, including: text messages, documents, audiovisual files, SMSes, and voice and video calls. Further, in addition to personal, business, or other types of conversations, the content can pertain to electronic transactions such as credit card security, password protection, directories, and storage drive protection, video on demand security, online gaming, gambling, electronic distribution of music, videos, documents, online learning systems, databases, cloud storage and cloud environments, bank transactions, voting processes, military communications, security of medical records, communication between medically implanted devices and doctors, etc. As will be described in more detail below, the exchange of communications is facilitated by security platform 102.

A. Installation/Initialization/Registration

Suppose a user of client device 106 (hereinafter referred to as "Alice") would like to send a secure message to her friend, Bob (a user of client device 114) in accordance with techniques described herein. In some embodiments, in order to send a message Bob, Alice first obtains a copy of a messaging application suitable for her device. For example, if Alice's tablet device runs iOS, she could obtain an "app" for her tablet from the Apple App Store (an example of software distribution server 106). Bob similarly obtains an appropriate application suitable for his client device 114 (e.g., an Android-based smartphone) from an appropriate location (e.g., the Google Play store). In some embodiments, client devices make use of a web-based application (e.g., made available by platform 102 through interface 118), instead of, or in addition to, a dedicated installed application.

Figure 2A:
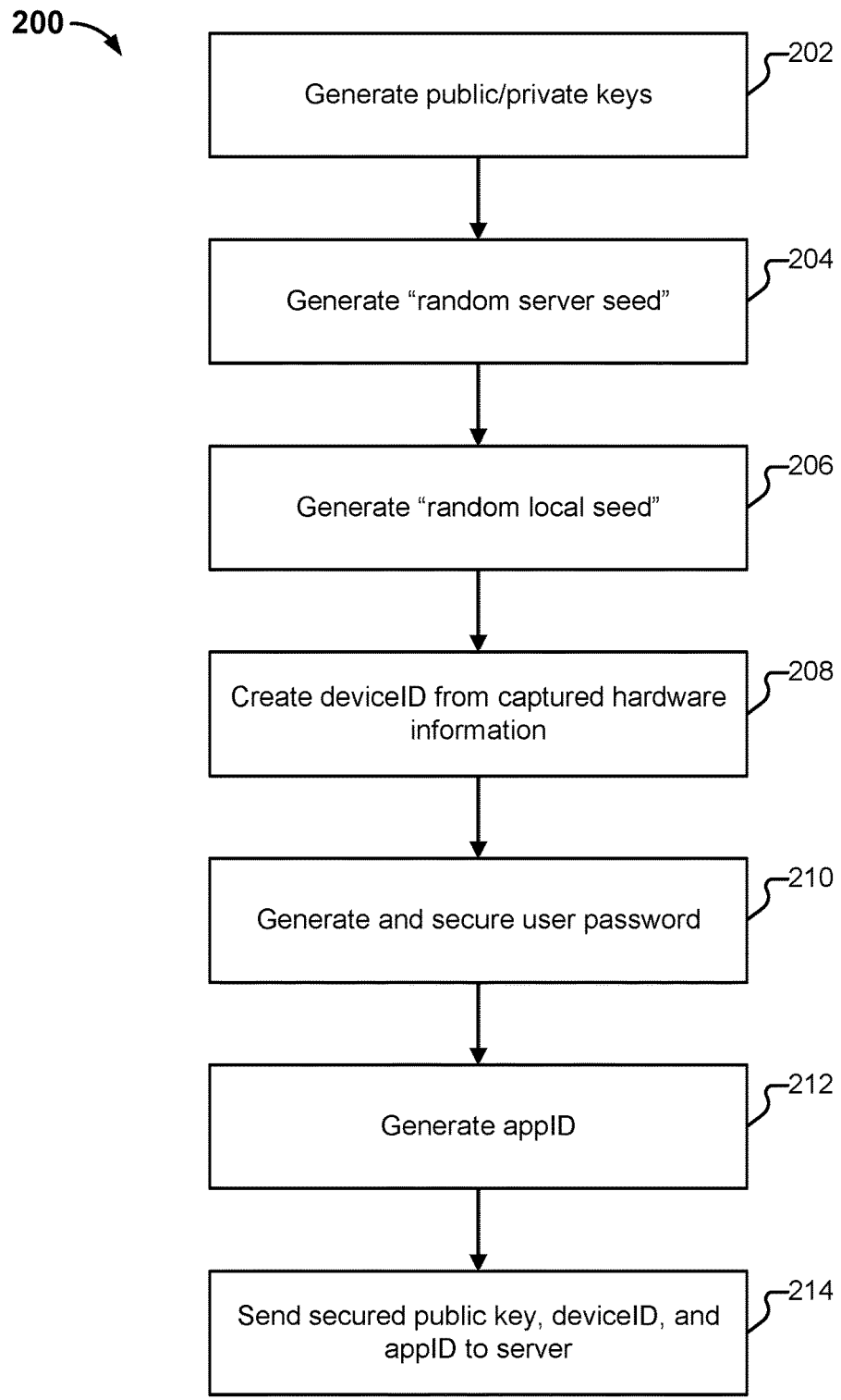
FIG. 2A illustrates an embodiment of an installation and registration process.
Figure 2B:
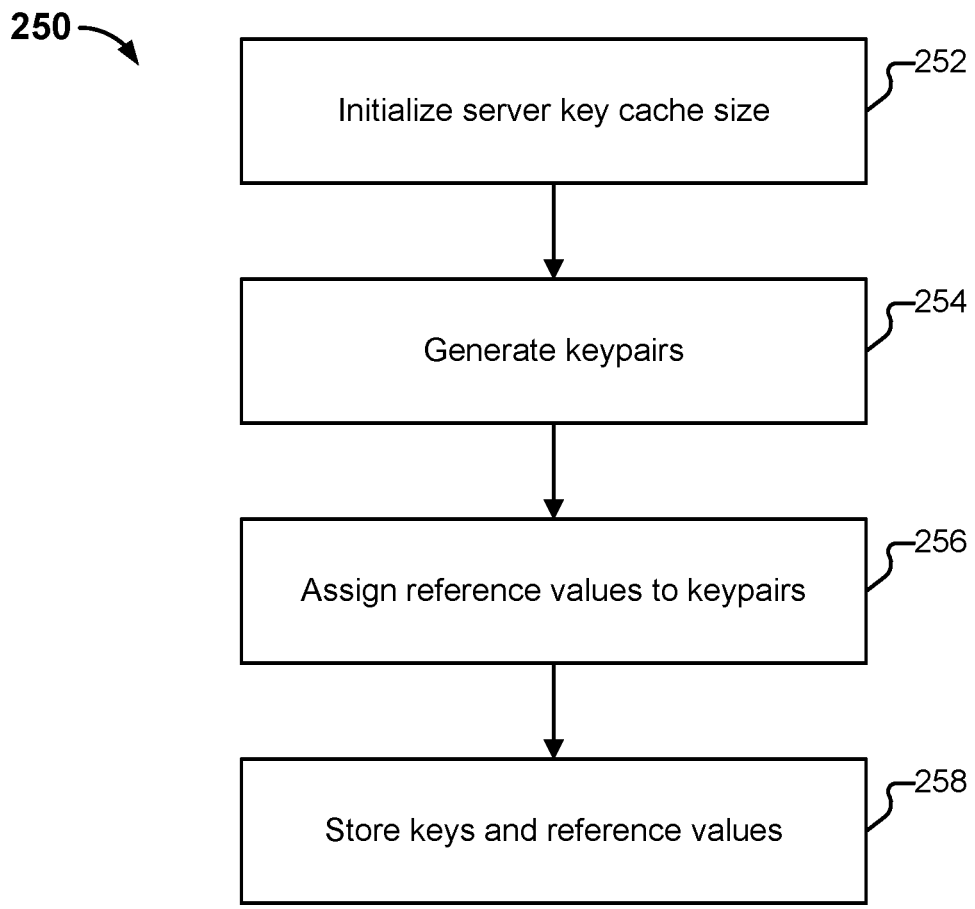
FIG. 2B illustrates an embodiment of a process for generating a pool of keypairs.

Once Alice's tablet 106 has obtained a copy of the messaging app, the app is installed, and Alice is able to register for an account. An instance of a messaging app usable in conjunction with the techniques described herein is depicted in FIG. 1 as app 116 (installed on device 106). Examples of events that can occur during an installation/initialization/registration process (200) are illustrated in FIGS. 2A and 2B and will now be described. While the events will be described in one order, events can also be performed in other orders and/or in parallel (instead of in sequence) in other embodiments. Further, various events can be omitted, in some embodiments, as applicable.

In some embodiments, process 200 is performed on a client device, such as Alice's client device 106. The process begins at 202 when a pool of public/private keypairs for the application is generated, on client device 106 (e.g., using RSA, ECDH, or any other appropriate asymmetric encryption algorithms). As one example, the keypairs can be generated using Eliptic Curve Algorithm with Diffie Helman Key Exchange (ECDH). Other cryptographic standards can also be used, such as RSA. In some embodiments, the keypairs are randomly seeded. As will be described in more detail below, each message Alice sends (whether to Bob or anyone else) can be encrypted with a unique, random key that is used only once then destroyed forensically by Alice (the sender's) device. The forensic destruction ensures that the deleted keys cannot be recovered from Alice's device, even via digital forensics methods.

FIG. 2B illustrates an embodiment of a process for generating a plurality of public/private keypairs. In some embodiments, process 250 is performed on a client device (such as client device 106) as portion 202 of process 200. Process 250 begins at 252 when the pool size associated with the client device is initialized. As one example, a default pool size of fifty keys is received as a parameter from platform 102 by application 116. The pool size can also be encoded into application 116 or otherwise provided to device 106 without requiring the server to transmit the initial pool size. As will be explained in more detail below, the pool size associated with a device can be dynamically adjusted, for example, such that a device (e.g., of a heavy user that is frequently offline) that initially has a pool size of 50 keys can have the size adjusted upward to a pool size of 200 keys (or more).

At 254, a pool of keys (i.e., a number of keypairs equal to the size initialized at 252) is generated on client device 106. As mentioned above, the keypairs can be generated using Eliptic Curve Algorithm with Diffie Helman Key Exchange (ECDH). Other cryptographic standards can also be used, such as RSA.

At 256, a reference value is assigned for each of the respective keypairs. As one example, suppose fifty keypairs are generated at portion 254 of process 250. At 256, fifty respective reference values are assigned to each of the respective keypairs. The reference values will be used to distinguish the various keys in the pool of keys from one another and can be assigned to the keypairs in a variety of ways. As one example, a six digit random number can be generated by device 106 as the first reference value for the first keypair, and each subsequent reference value can be selected as an increment of the first reference value. As another example, every reference value can be randomly selected. Other schemes for selecting/assigning reference values can be employed at 256 as applicable.

At 258, the private keys and reference values are stored (e.g., in a secure database residing on device 106). As will be described in more detail below, the corresponding public keys will be transmitted to platform 102 (along with the associated reference values) and platform 102 will designate one of the public keys in the pool as a reserve key.

Returning to FIG. 2A, at 204, a "random server seed" is generated, and at 206, a "random local seed" is generated. The seeds are used in conjunction with cryptographic key generation, and in some embodiments, the seeds are determined based on captured hardware information (described in more detail below).

At 208, a device identifier ("deviceID") is created from captured hardware information. Examples of captured hardware information include: hard drive identifiers, motherboard identifiers, CPU identifiers, and MAC addresses for wireless, LAN, Bluetooth, and optical cards. Combinations of information pertaining to device characteristics, such as RAM, CACHE, controller cards, etc., can also be used to uniquely identify the device. Some, or all, of the captured hardware information is run through a cryptographic hash algorithm such as SHA-256, to create a unique deviceID for the device. The captured hardware information can also be used for other purposes, such as to seed cryptographic functions.

At 210, Alice is asked, via an interface provided by app 116, to supply a desired username. Alice enters "Alice" into the interface. A determination is made as to whether the username is available. As one example, app 116 can supply a cryptographic hash of "Alice" to platform 102 for checking. If platform 102 does not already have a record for that hash, the username "Alice" is available for Alice to use. If platform 102 already has a record of that hash, Alice is instructed by the interface to pick an alternate username. Once Alice has selected an available username, she is asked to supply a password.

At 212, an application identifier ("appID") is created. The appID is a unique identifier for the particular installation of the messaging app. If Alice installs the messaging app on multiple devices, each of her devices will have its own unique appID. (And, each of her devices will also have its own unique deviceID.) In some embodiments, the appID is created by hashing Alice's selected password and other information such as device information.

Finally, at 214 Alice's public keys (and reference values), deviceID, and appID are sent to platform 102 in a secure manner. As one example, in some embodiments app 116 is configured to communicate with platform 102 via TLS.

At the conclusion of process 200, Alice is ready to send and receive secure communications, described in Sections C and E below, respectively.

As mentioned above, alternate versions of processes 200 and/or 250 can be used in accordance with the techniques described herein. As one example, username/password selection (210) can be performed prior to other portions of process 200. As another example, the random server seed generation (204) and random local seed generation (206) can be performed prior to the keypair generation (202), e.g., with the local seed being used in conjunction with the generating of the keypairs. As yet another example, portions of processes 200 and/or 250 can be combined and/or omitted as applicable. For example, instead of generating a pool of fifty key pairs (254), assigning reference values to the pool as a batch operation (256) and storing the keys/values as a batch operation (258), fifty iterations of a process that generates a key pair, assigns a reference value, and stores the information can be performed.

B. Security Platform

As mentioned above, security platform 102 is configured to facilitate the exchange of communications (e.g., among any/all of client devices 106-114). Additional detail regarding various aspects of platform 102 will now be provided.

Security platform 102 includes one or more interface(s) 118 for communicating with client devices, such as client devices 106-114. As one example, platform 102 provides an application programming interface (API) configured to communicate with apps installed on client devices, such as app 116 and app 138. Platform 102 can also provide other types of interfaces, such as a web interface, or stand alone software programs for desktops and laptops, running on various Operating Systems (OSes). The web interface can allow users of client devices such as client devices 108 and 110 to exchange messages securely (whether with one another or other users), without the need for a separately installed messaging application. The stand alone software program allows users to exchange secure messages via software that is downloaded by each user.

Security platform 102 also includes a database 120. Included in database 120 is a record for each user of platform 102. Each record has associated with it information such as the user's public key pool and associated reference values, deviceID(s), appID(s), and messages. As shown in FIG. 1, database 120 is relational and stores information in a variety of tables, including a table of hashed usernames (124), a table of public keys and reference values (126), a table of deviceIDs (128), a table of appIDs (130), and a table of messages (132). Other techniques can also be used to store the information used by platform 102. For example, messages can be stored in a separate storage 136 instead of being stored within database 120.

Finally, security platform 102 includes a processing engine 134 which performs a variety of tasks, including interacting with database 120 on behalf of interface(s) 118. As will be described in more detail below, one task performed by platform 102 (e.g., by processing engine 134) is to designate one of the keys in the pool of public keys (e.g., received from Alice at the conclusion of portion 214 of process 200) as a "reserve" key. Another task performed by platform 102 (e.g., processing engine 134) is to facilitate the addition of new keys to a user's key pool as the keys are used. Yet another task performed by platform 102 (e.g., processing engine 134) is to dynamically adjust the size of a user's key pool as needed.

The embodiment of platform 102 depicted in FIG. 1 comprises standard commercially available server hardware (e.g., having a multi-core processor(s), 8G+ of RAM, gigabit network interface adaptor(s), and hard drive(s)) running a typical server-class operating system (e.g., Linux). In various embodiments, platform 102 is implemented across a scalable infrastructure comprising multiple such servers, solid state drives, and/or other applicable high-performance hardware.

Whenever platform 102 is described as performing a task, either a single component or a subset of components or all components of platform 102 may cooperate to perform the task. Similarly, whenever a component of platform 102 is described as performing a task, a subcomponent may perform the task and/or the component may perform the task in conjunction with other components.

C. Sending DSB Secured Messages

Returning back to Alice's desire to send a message to Bob: at the conclusion of Section A above, Alice has successfully registered her username ("Alice") with security platform 102. And, Bob is also a user of platform 102. Suppose Alice would like to send a message to Bob. She starts app 116 and is presented with an interface that includes a "compose" option. Alice selects the compose option and is presented with a message composition interface.

Figure 3:
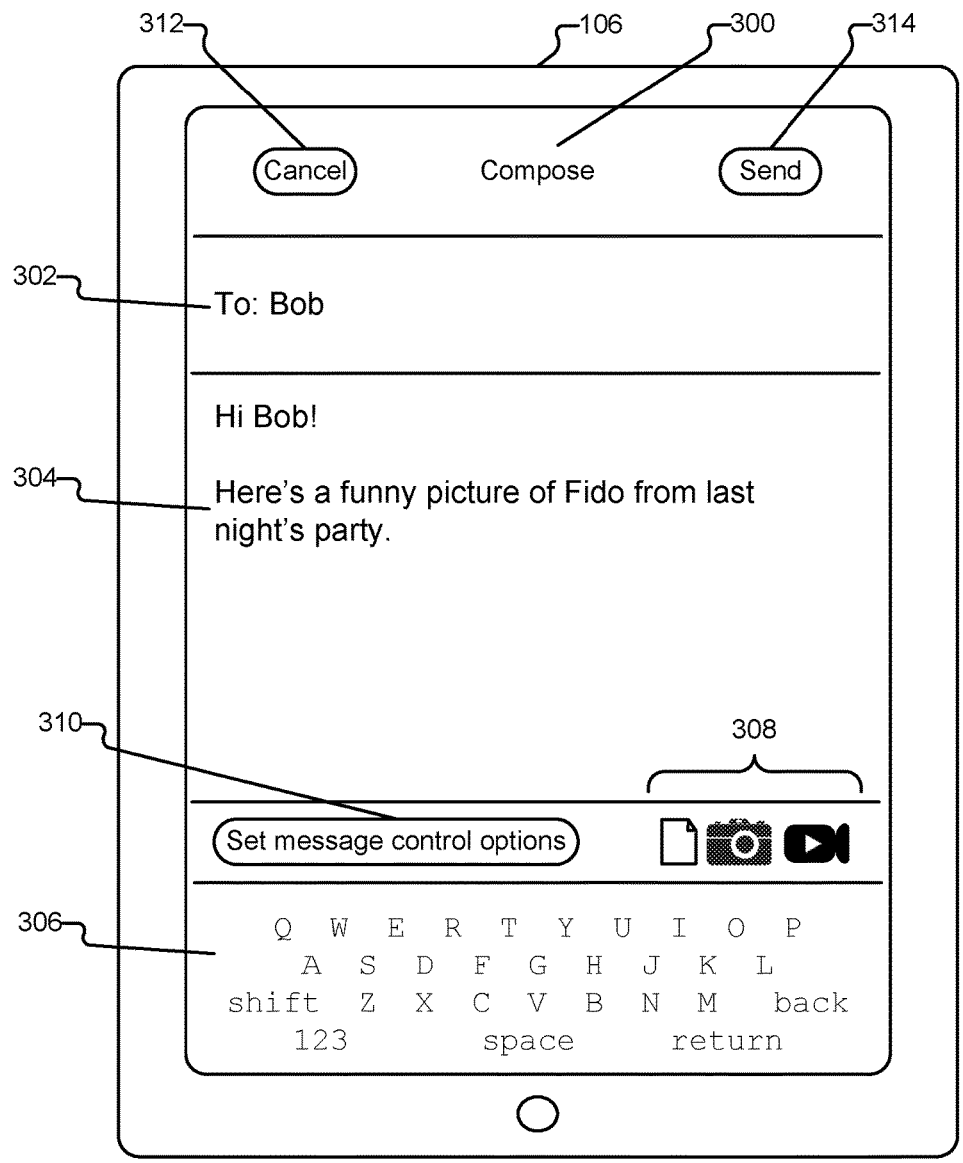
FIG. 3 illustrates an example of an interface.

An example message composition interface is shown in FIG. 3. In particular, FIG. 3 depicts interface 300 as rendered on an example tablet device 106, connected to the Internet via an appropriate connection, such as: 3G, 4G or higher cellular connection, WiFi, Satellite, wireless or wired LANs, Bluetooth, etc. Tablet device 106 includes a touchscreen. An on-screen keyboard is provided for Alice in region 306. Alice can enter the usernames of one or more recipients in region 302. She can enter message text in region 304. Alice can optionally add attachments by interacting with buttons shown in region 308. Examples of attachments include, but are not limited to: documents, pictures, and audiovisual clips. By selecting button 310, Alice can specify various message control options, such as: the lifetime/expiration of the message; on which device(s) it can be unencrypted/read; and sharing, saving, forwarding, recalling, and deleting options.

If Alice is satisfied with her message, she can send it to Bob by clicking the send button (314). If she wishes to cancel out of composing the message, she can click the cancel button (312). Suppose Alice clicks send button (314) after composing the message shown in interface 300. An example of the events that occur, in some embodiments, in conjunction with Alice sending a message is illustrated as process 400 in FIG. 4 and will now be described.

Figure 4:
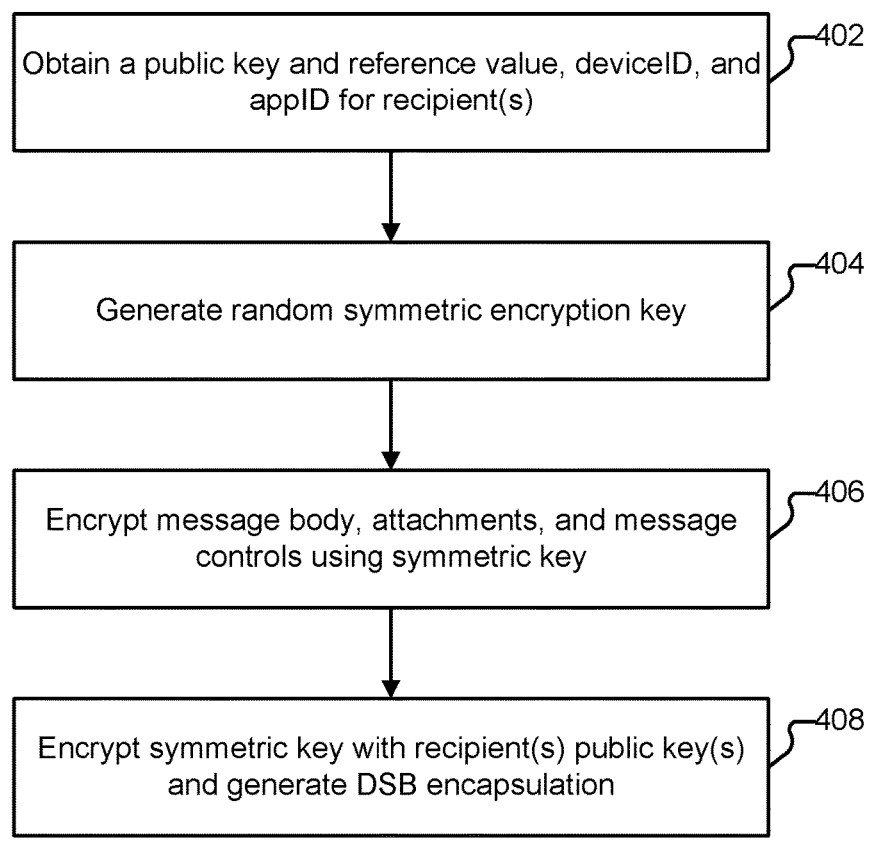
FIG. 4 illustrates an example of a message sending process.

FIG. 4 illustrates an example of a process for sending a DSB-secured message. In some embodiments, process 400 is performed on a client device, such as Alice's client device 106. The process begins at 402 when a particular public key (from the user's pool of public keys) and associated reference value, deviceID, and appID of a recipient are obtained from platform 102. As will be explained in more detail below, the recipient's particular public key, deviceID and appID are used in the encryption of the symmetric key used to encrypt data, and in the DSB encapsulation of the message for the hardware/appID binding of the message. As one example, app 116 can request the information from platform 102 via an API (e.g., interface 118). In some embodiments, the information is retrieved when Alice enters the recipient's name into region 302. In other embodiments, the information is retrieved when Alice clicks send button 314, or at any other appropriate time (e.g., while she is composing a message). In the example shown in FIG. 3, Alice is only sending a message to Bob. If she also desires to send the message to other recipients, she can enter their names in region 302 as well, and one of their respective public keys (again selected from their respective pools of public keys) and associated reference values, deviceIDs, and appIDs will also be retrieved at 402.

At 404, a random symmetric encryption key is generated (e.g., by app 116 on device 106). As one example, the symmetric key is an AES 256 bit key. At 406, the symmetric encryption key is used to encrypt the message body, any attachments, and any message control options. In some embodiments, Alice's own information (e.g., public key(s) and associated reference value(s), deviceID(s), and appID(s) are included in the DSB as well. Finally, at 408, the symmetric key is encrypted with the particular public key of each recipient (obtained from the pool of public keys). A DSB encapsulation is then generated, and contains the aforementioned components and reference values of the public keys used to encrypt the symmetric key. Examples of the DSB format are provided in Section D below.

In some cases, a user may own multiple devices. For example, Bob may be the owner of device 114 and 112, both of which are configured with secure messaging apps. Each of Bob's installations will have its own deviceID and appID. When the DSB is created, each of Bob's devices will be considered a separate device under the same username account.

The generated DSB is securely transmitted to platform 102 (e.g., by being encrypted with a symmetric key shared by the app and platform 102, and also encapsulated by TLS as an additional security layer). Irrespective of how many recipients Alice designates for her message (and, e.g., how many recipients there are or how many devices Bob has), only one DSB will be created and transmitted to platform 102. Upon receipt of the DSB, processing engine 134 opens the DSB and determines the recipients of the message. Specifically, the processing engine 134 performs a match against the deviceIDs (in a cryptographic hash and camouflaged representation) included in the DSB and the deviceIDs stored in database 120 as well as the username (in a cryptographic hash and camouflaged representation) in the DSB and the ones stored in the database 120. A cryptographic hash and camouflaged representation means that the hash algorithm (i.e. SHA256) that is used for the deviceID, username, and appID values, is further camouflaged, in some embodiments, by taking multiple hashes of the result values (i.e. multiple rounds of SHA256 of the previous SHA256 value—i.e. SHA(SHA(SHA(SHA . . . ))). Processing engine 134 also creates an entry for the received DSB in message table 132 and notifies the recipient(s) that a new message is available. In various embodiments, other actions are also performed by platform 102 with respect to the DSB. As one example, platform 102 can be configured to remove the DSB as soon as the recipient successfully downloads it. As another example, platform 102 can enforce an expiration time (e.g., seven days) by which, if the DSB has not been accessed by the recipient, the DSB is deleted. Where multiple recipients are included in a DSB, platform 102 can be configured to keep track of which recipients have downloaded a copy of the DSB, and remove it once all recipients have successfully downloaded it (or an expiration event has occurred).

D. DSB Examples

Figure 5:
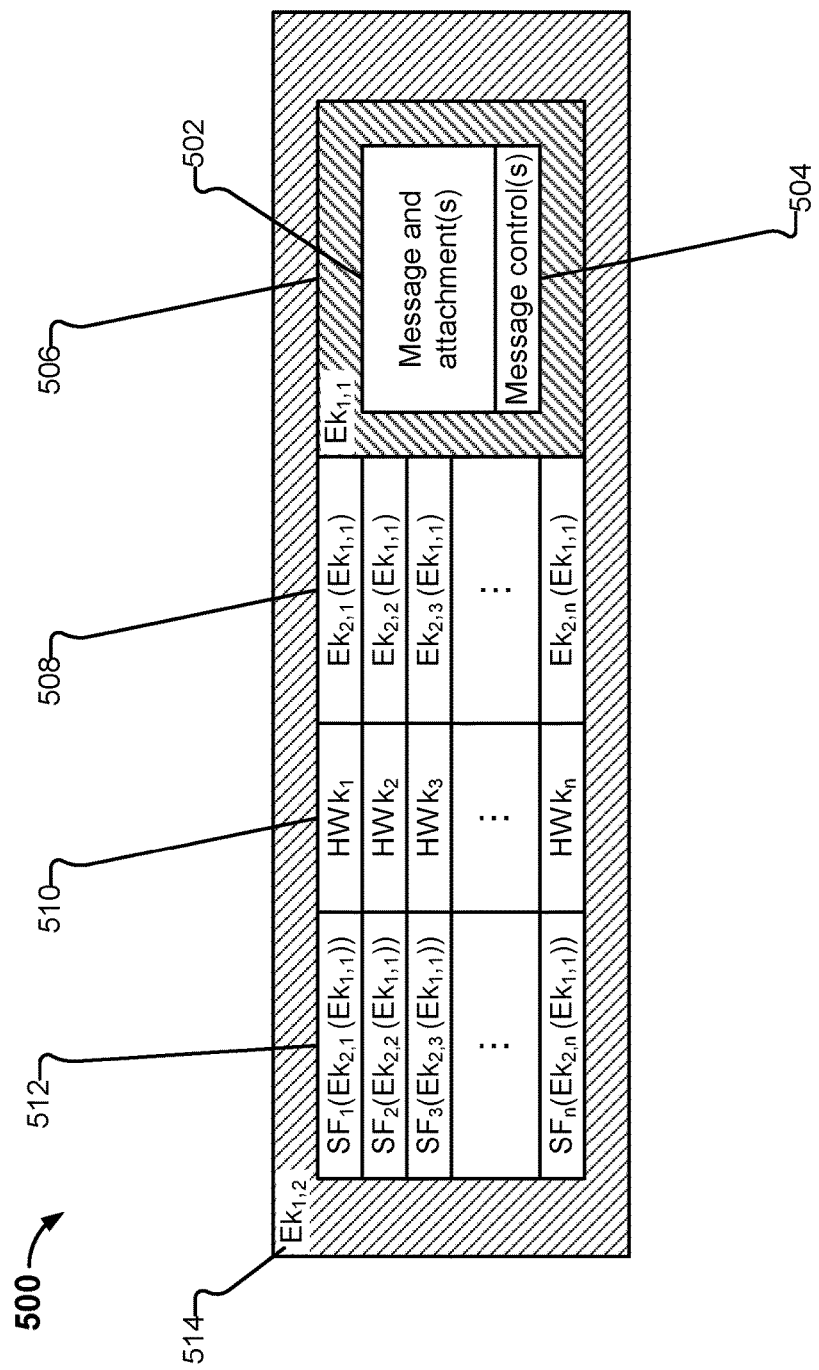
FIG. 5 illustrates an example of a digital security bubble.

FIG. 5 illustrates an example of a digital security bubble (DSB). DSB 500 is an example of output that can be generated by app 116 as a result of executing process 400. In the example shown, DSB 500 includes a message and optional attachments (502), and one or more message controls (504) encrypted with a key $Ek_{1,1}$ (encrypted portion 506). In some embodiments, key $Ek_{1,1}$ is generated by app 116 at portion 404 of process 400. Additional detail regarding portion 506 is shown in FIG. 7, where SSK in FIG. 7 is $Ek_{1,1}$ of FIG. 5 and represents the sender's symmetric shared key used to encrypt the message and attachments.

DSB 500 also includes, for each message recipient 1-$n$, the key $Ek_{1,1}$ encrypted by each of the recipient's respective particular public keys (as shown in region 508). Further, DSB 500 includes a combination of each recipient's respective deviceID, hashed username, appID, and the reference value associated with the particular public key (collectively denoted $HWk_{1-n}$) in region 510. These constituent parts are also referred to herein as "parameters." Additional detail regarding the parameters is shown in FIG. 9—namely, a plurality of parameters (such as hashed username, deviceID, and appID) are encrypted using SK2, which is a symmetric key generated by the client and shared with platform 102.

In some embodiments (e.g., as is shown in FIG. 5), a spreading function is used to spread the encrypted symmetric keys inside the DSB (as shown in region 512), by spreading the bits of the encrypted key in a spreading function generated pattern, with the default function being a sequential block or data. The spreading function also contains the cryptographic hashed representation of the recipient usernames that are used by the server to identify the recipients of the message and to set the message waiting flag for each of them. Finally, the DSB is itself encrypted using key $Ek_{1,2}$ (encrypted portion 514), which is a symmetric key shared between app 116 and platform 102. Additional detail regarding portions 514 and 508 are shown in FIG. 8, where SK1 in FIG. 8 is $Ek_{1,2}$ in FIG. 5 and represents the symmetric encryption key shared by the app and platform 102, and where User$_1$Pubkey in FIG. 8 is Ek$_{2,1}$ in FIG. 5 and represents the recipient's particular public key (e.g., selected from the pool of public keys generated at 202).

Figure 6:
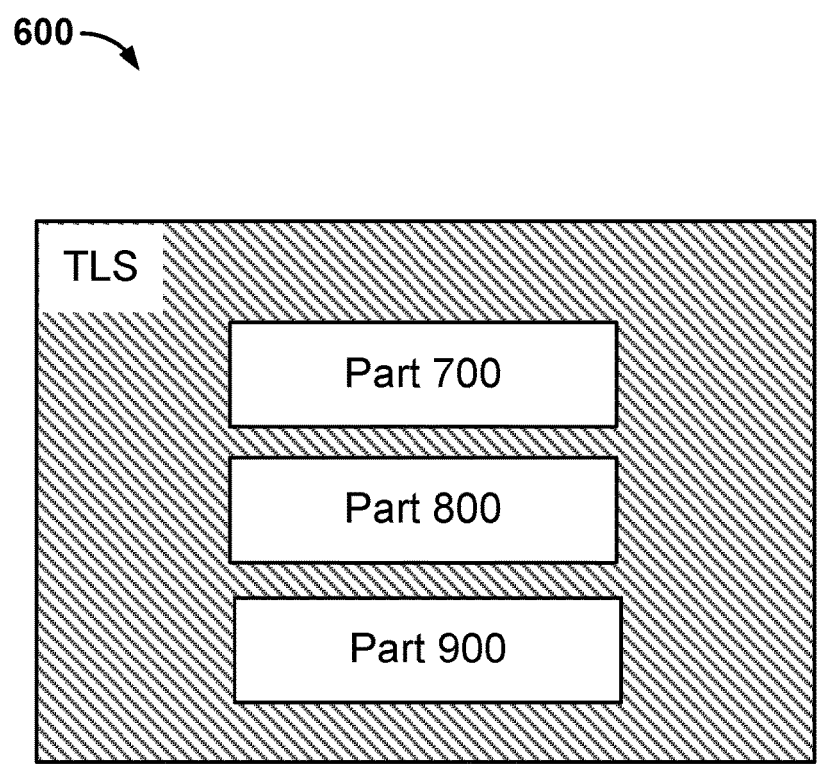
FIG. 6 illustrates an example of a digital security bubble.
Figure 7:
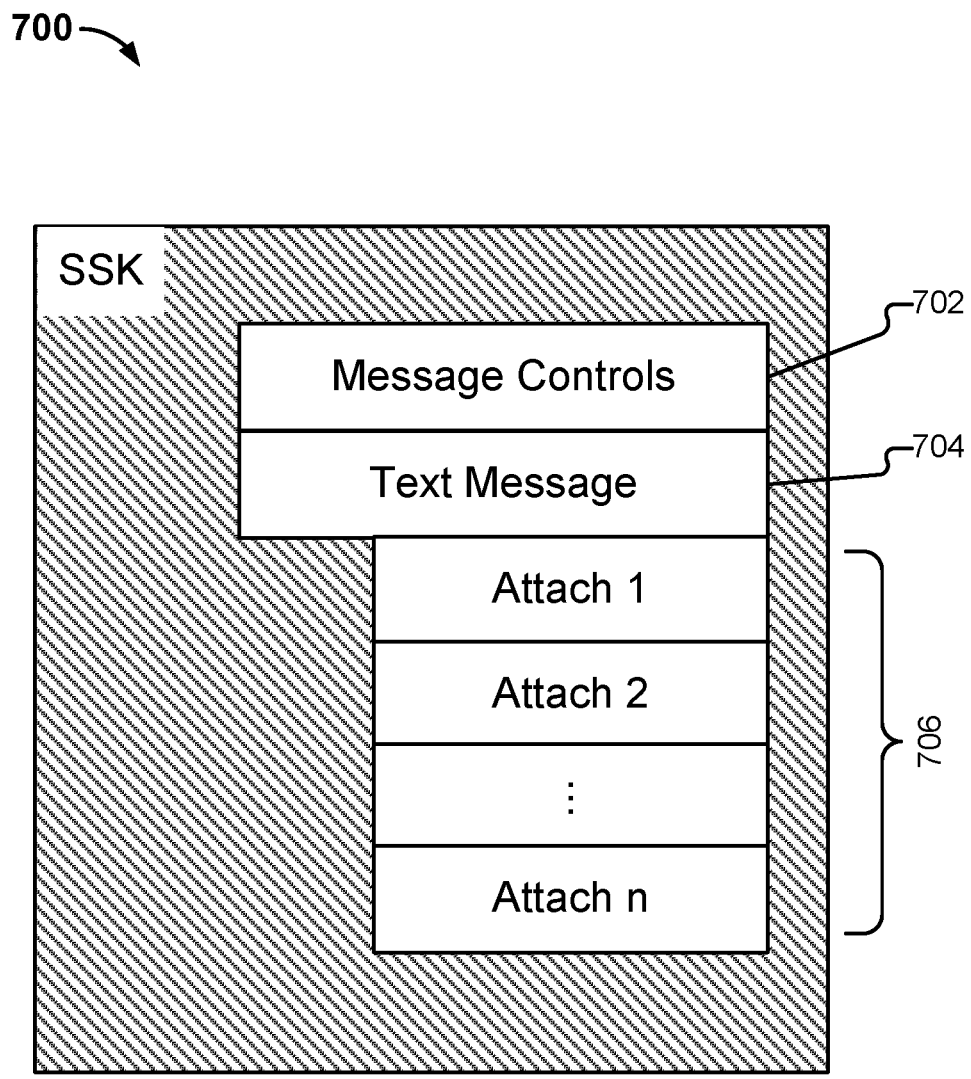
FIG. 7 illustrates an example of a portion of a digital security bubble.
Figure 8:
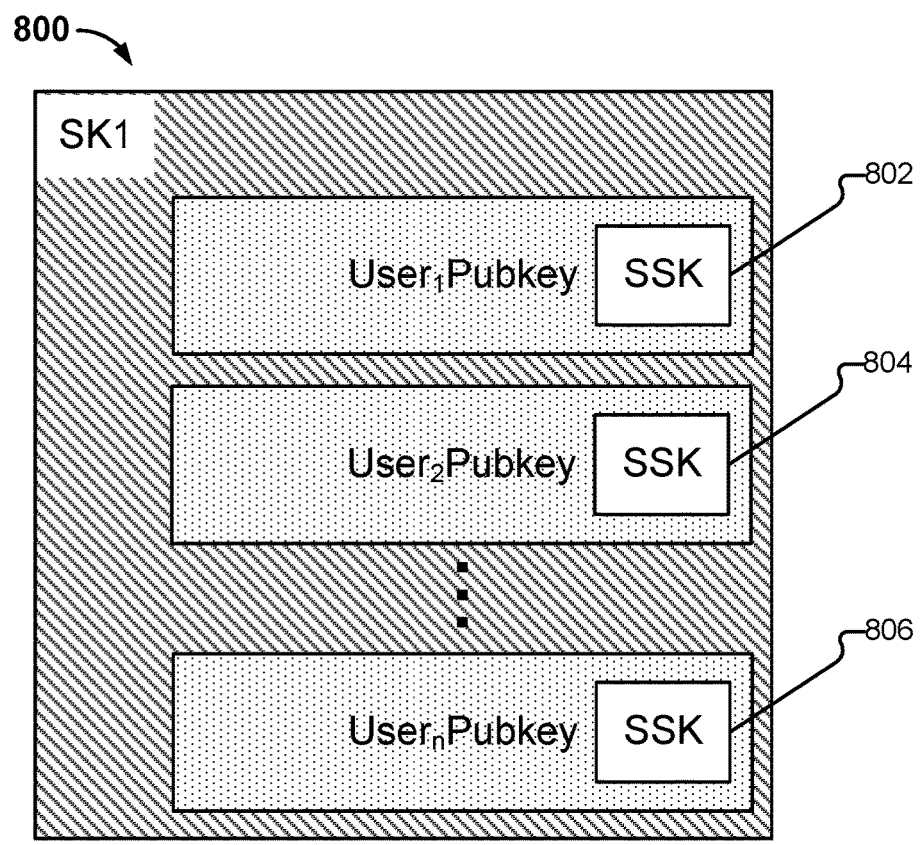
FIG. 8 illustrates an example of a portion of a digital security bubble.
Figure 9:
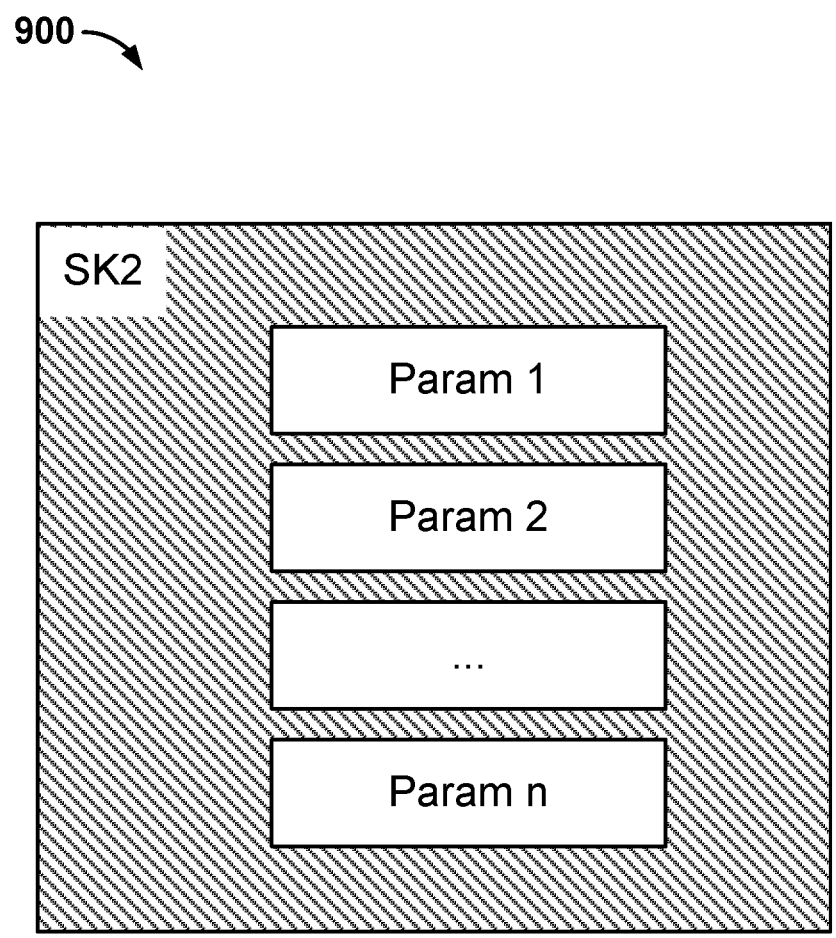
FIG. 9 illustrates an example of a portion of a digital security bubble.

FIGS. 6-9 illustrate additional examples of the construction of an embodiment of a DSB. FIG. 6 illustrates an example of a DSB 600. DSB 600 encapsulates three subcomponents—part 700 (the encrypted message, attachments, and controls), part 800 (the symmetric key encrypted with each recipient's particular public key selected from the recipients' respective key pools), and part 900 (encrypted message parameters). As with DSB 500, a symmetric key (shared by app 116 and platform 102) is used to secure the DSB. In addition, the transmission of the DSB to the server is encapsulated with TLS for an additional security layer. FIG. 7 illustrates part 700 of DSB 600. In particular, part 700 includes the message controls (702), message (704), and attachments (706). Part 700 is encrypted using a shared symmetric key SSK (e.g., Ek$_{1,1}$). FIG. 8 illustrates part 800 of DSB 600. In particular, part 800 includes the shared symmetric key, encrypted to each of the recipients' respective particular public keys (selected from the recipients' respective key pools). Further, the collection of encrypted keys (802-806) is encrypted using symmetric key SK1. FIG. 9 illustrates part 900 of DSB 600. In particular, part 900 includes encrypted message parameters. Part 900 is encrypted using symmetric key SK2.

E. Receiving DSB Secured Messages

As mentioned above, Bob is also a user of platform 102. When Bob loads his copy of the messaging app on his smartphone (i.e., app 138 on device 114), the app communicates with platform 102 (e.g., via interface 118) to determine whether Bob has any new messages. As will be described in more detail below, platform 102 will also determine how many additional keypairs Bob's device should generate to replenish his pool, and facilitate the generation of those keypairs. Since Alice has sent a message to Bob since he last used app 138, a flag is set in database 120, indicating to app 138 that one or messages are available for download.

Figure 10:
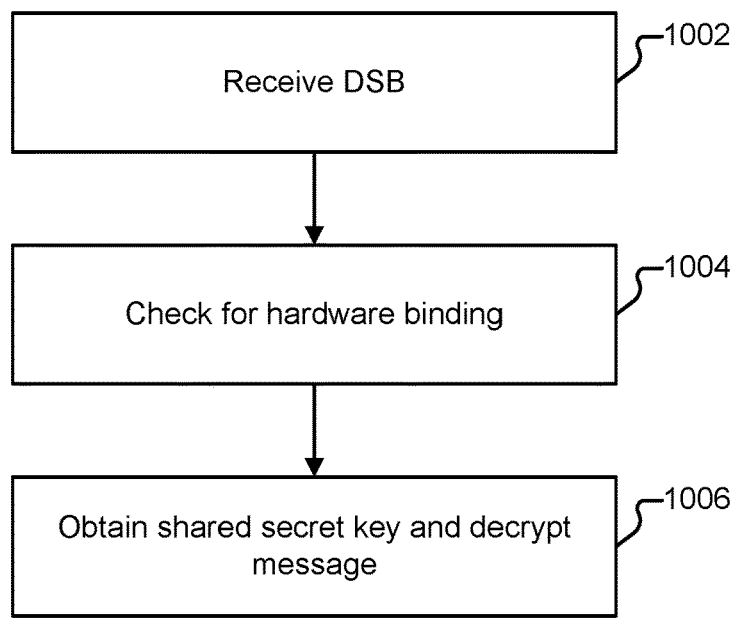
FIG. 10 illustrates an example of a process for accessing a message included inside a digital security bubble.

FIG. 10 illustrates an example of a process for accessing a message included inside a digital security bubble. In some embodiments, process 1000 is performed on a client device, such as Bob's client device 114. The process begins at 1002 when a DSB is received. As one example, a DSB is received at 1002 when app 138 contacts platform 102, determines a flag associated with Bob's account has been set (e.g., indicating he has one or more new messages), and downloads the DSB from platform 102. In such circumstances, upon receipt of the DSB, client 114 is configured to decrypt the DSB using the particular private key of Bob that corresponds to the public key that was selected from his pool at message creation time (and is identifiable by the reference value included in the DSB).

At 1004 (i.e., assuming the decryption was successful), hardware binding parameters are checked. As one example, a determination is made as to whether device information (i.e., collected from device 114) can be used to construct an identical hash to the one included in the received DSB. If the hardware binding parameters fail the check (i.e., an attempt is being made to access Alice's message using Bob's keys on a device that is not Bob's), contents of the DSB will be inaccessible, preventing the decryption of Alice's message. If the hardware binding parameter check is successful, the device is authorized to decrypt the symmetric key (i.e., using Bob's private key generated at 202) which can in turn be used to decrypt Alice's message.

F. Additional Example Processes

The following are examples of processes that can be performed by various entities present in environment 100, such as platform 102 and devices 106 and 114 in various embodiments (whether as alternate versions of or additional processes to those described above). The processes can also be performed outside of environment 100, e.g., by other types of platforms and/or devices.

Figure 11:
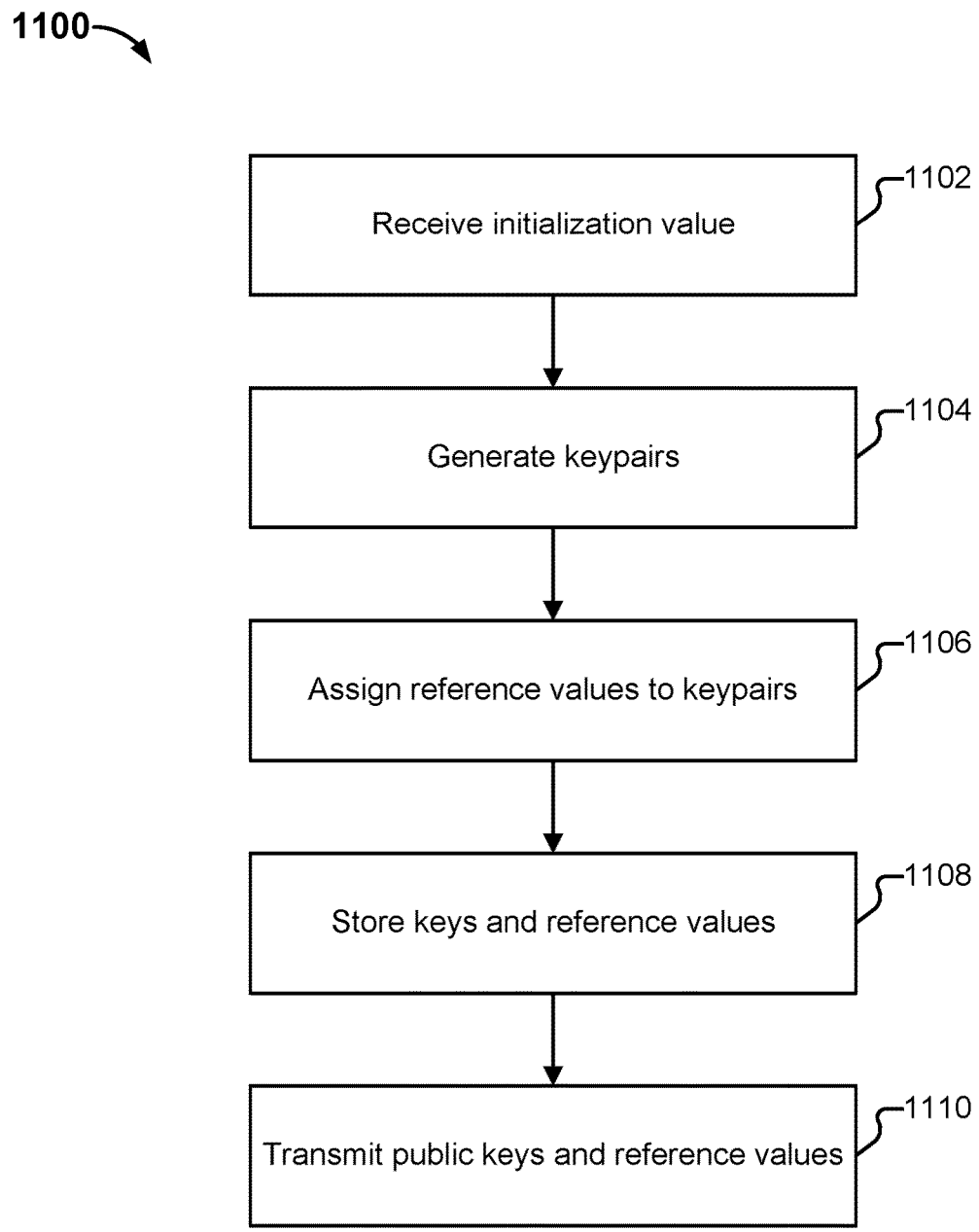
FIG. 11 illustrates an example of a registration process.

FIG. 11 illustrates an example of a registration process. In some embodiments, process 1100 is performed by device 106. Process 1100 can also be performed by other devices, including devices in environments other than those shown in FIG. 1. Process 1100 begins at 1102 when an initialization value is received. As one example, an initialization value of 50 (corresponding to a target minimum server key cache size of fifty public keys to be stored on platform 102) is received at 1102. In some embodiments, in response to receiving a request from a device, such as device 106, platform 102 sets a server count (C)=0. The server count represents the number of public keys currently stored on platform 102 associated with the device. As device 106 is registering, no keys are present yet on platform 102.

At 1104, a number of keypairs is generated. In this example, a number of asymmetric keypairs equal to the initialization value received at 1102 (e.g., fifty) is generated. In some embodiments, the keypairs are randomly seeded.

At 1106, reference values (e.g., usable to uniquely identify each of the key pairs and described in more detail above) are assigned for each of the keypairs generated at 1104.

At 1108, the private key portion of the key pairs (i.e., the fifty private keys) and associated reference values are securely stored locally (e.g., on device 106). As one example, the private keys are inserted into a database resident on device 106 and secured using an AES key derived from the password selected by Alice at portion 210 in process 200.

Finally, at 1110, the public key portion of the key pairs (i.e., the fifty public keys) and associated reference values are securely transmitted to platform 102. As mentioned above, platform 102 will designate one of the fifty keys as a reserve key (e.g., by setting a flag associated with that particular key).

Figure 12:
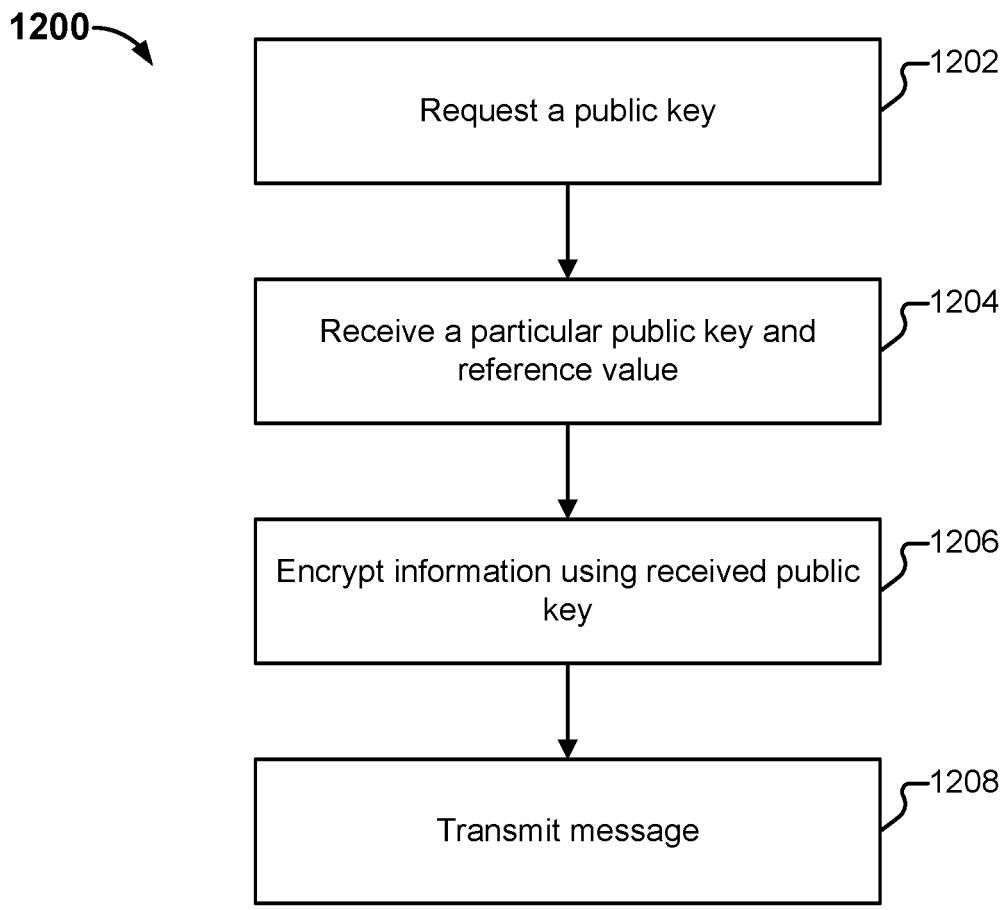
FIG. 12 illustrates an example of a process for sending a message.

FIG. 12 illustrates an example of a process for sending a message. In some embodiments, process 1200 is performed by device 114 (e.g., when Bob wants to send a message to Alice). Process 1200 begins at 1202 when device 114 requests a public key associated with Alice from platform 102. If multiple public keys for Alice are present in her pool of keys (i.e., the pool of public keys stored on platform 102 for Alice), the platform will preferentially select (whether randomly, sequentially, or by any other appropriate selection technique) one of the non-reserve keys, and delete the selected key in an atomic operation in conjunction with sending the selected key to device 114. As will be described in more detail below, if only one public key is present for Alice (i.e., only the reserve key remains in the pool), platform 102 will send the reserve key to device 114, but will not delete the reserve key from platform 102 (until such time as the reserve key is replaced with a new key designated as the reserve).

At 1204, a public key is received (e.g., by device 114 from platform 102) along with the reference value associated with the key.

At 1206, the received public key is used to encrypt information, such as a message, or other information (e.g., a symmetric key which in turn is used to encrypt the message). The key reference value associated with the received public key is included in the message metadata or otherwise incorporated into the message payload.

Finally, at 1208, device 114 sends the message (e.g., to platform 102 for retrieval by Alice). Note that using techniques described, Alice's device(s) need not be online (e.g., connected to platform 102) at the time Bob composes and/or sends messages to her.

Figure 13:
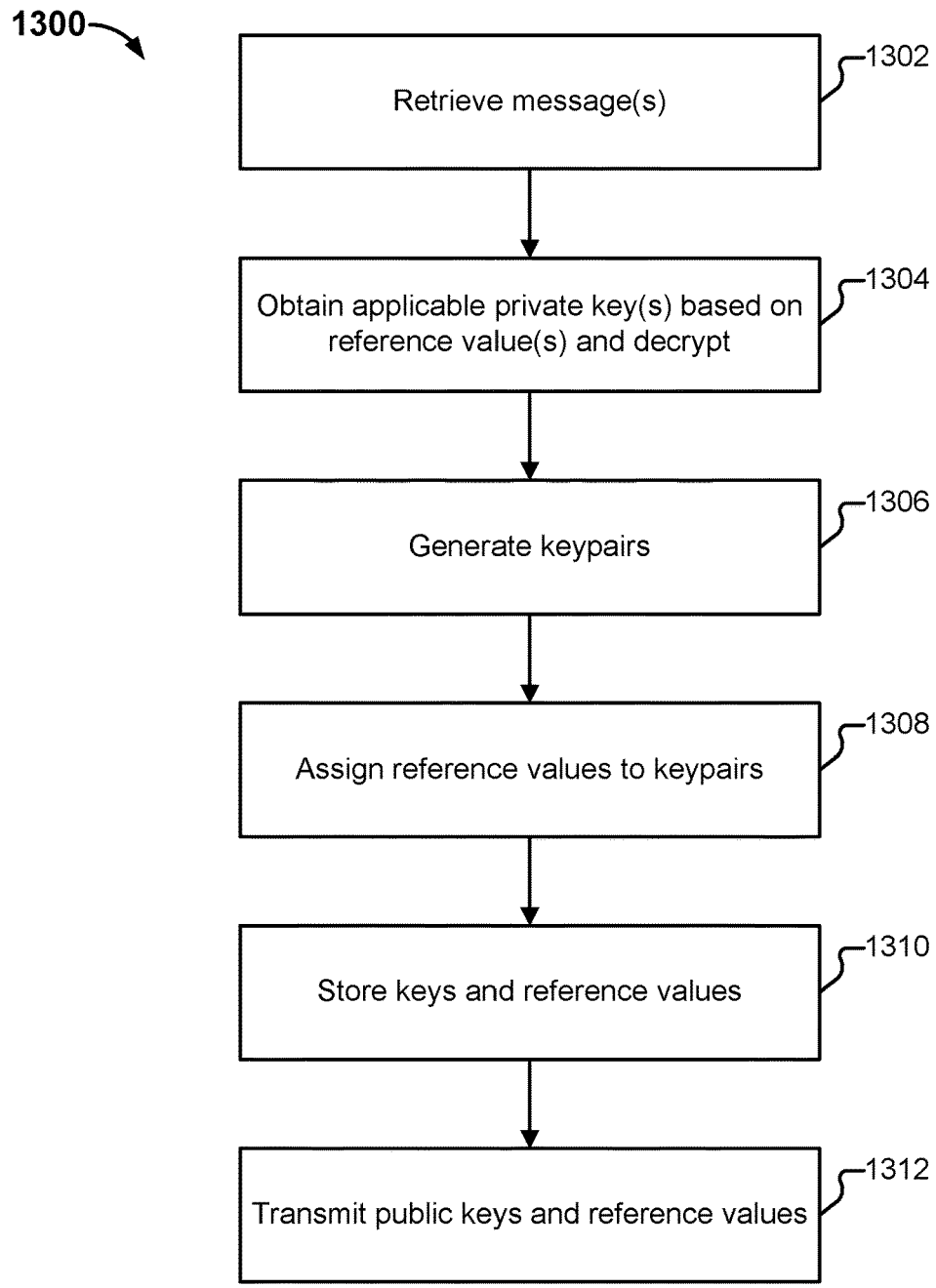
FIG. 13 illustrates an example of a process for performing a synchronous key cache update.

FIG. 13 illustrates an example of a process for performing a synchronous key cache update. In some embodiments, process 1300 is performed by device 106 (e.g., when Alice connects to platform 102 to retrieve messages). The process begins at 1302 when device 106 connects to platform 102 and retrieves one or more messages.

For each retrieved message (at 1304), read the respective key reference value (e.g., included in the respective message as metadata), retrieve the appropriate private key (i.e., having the key reference value) from local storage on device 106, and decrypt the message(s).

At 1306, device 106 generates additional keypairs (i.e., to replenish public keys used from the pool on platform 102 by Bob). The number of keys to be generated can be determined in a variety of ways. As one example, device 106 can generate a number of new keypairs equal to the number of messages she received at 1302. As another example, device 106 can be instructed (whether by platform 102 or local instructions) to generate the lesser of: A: (the number of messages downloaded at 1302\*V), where (V) is a variable impacting the desired expansion rate of the server cache size (e.g. 0.9); or B: the initialization value (e.g., 50 keys, as discussed at 1102 in process 1100).

At 1308 (similar to 1106), reference values (e.g., usable to uniquely identify each of the key pairs and described in more detail above) are assigned for each of the keypairs generated at 1308.

At 1310 (similar to 1108), the private key portion of the key pairs (i.e., the new private keys) and associated reference values are securely stored locally (e.g., on device 106). As one example, the private keys are inserted into a database resident on device 106 and secured using the password selected by Alice at 210 in process 200.

Finally, at 1312 (similar to 1110), the public key portion of the key pairs (i.e., the new public keys) and associated reference values are securely transmitted to platform 102. In this example, suppose Alice's reserve key was not depleted. The key originally designated as her reserve key remains present on platform 102 and remains designated as the reserve key. Now suppose Alice's reserve key was depleted (e.g., because Bob and/or other users of platform 102 sent Alice more than fifty messages prior to her connecting to platform 102). The first 49 messages addressed to Alice would make use of those public keys in her pool not designated as the reserve key. Any additional messages sent to Alice before she can replenish her pool will all make use of her reserve public key (i.e., messages 50, 51, and 52—whether from Bob or others, will all make use of the same public key for Alice—her reserve key). As will be explained below, when Alice's pool has been deleted (i.e., her reserve key is being used), a flag will be set on platform 102 indicating that, in conjunction with her next execution of process 1300 (or portions thereof, as applicable), a new key should be designated as the reserve key, and the existing reserve key be destroyed. Additional actions can also be taken (e.g., by platform 102) in response to Alice depleting her key pool, such as by increasing the size of her pool.

Figure 14:
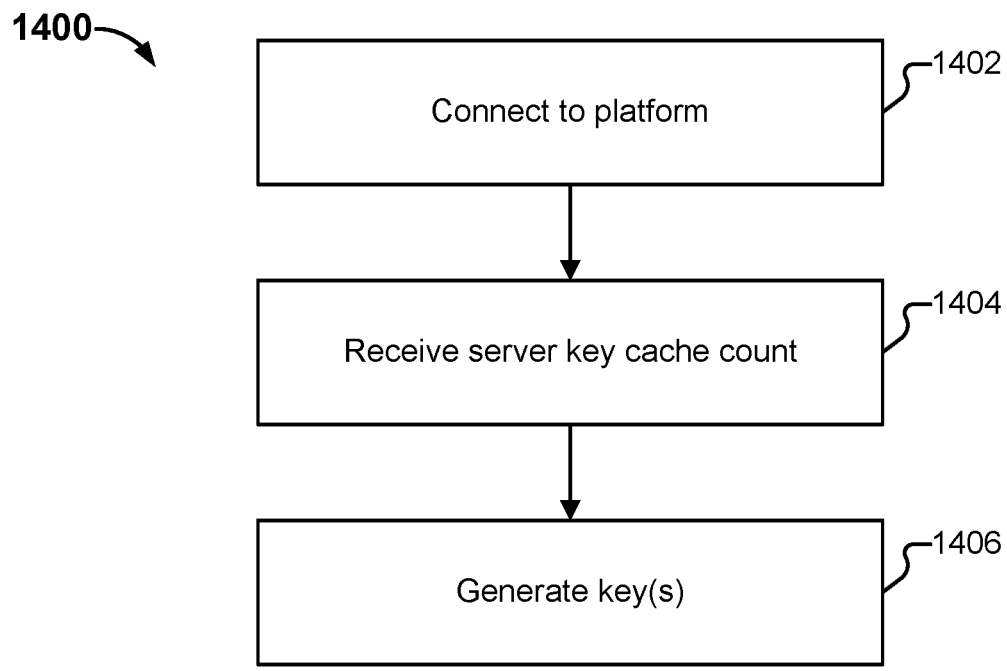
FIG. 14 illustrates an example of a process for performing an asynchronous key cache update.

FIG. 14 illustrates an example of a process for performing an asynchronous key cache update. In some embodiments process 1400 is performed by device 106. Process 1400 begins when device 106 connects to platform 102. The connection can be periodic (e.g., app 116 can be configured to connect to platform 102 once a day, once an hour, etc.) and can also be in response to triggering events (e.g., Alice's phone was powered off and has just been powered on, has just connected to a cellular or other network, etc.).

At 1404, the device receives the current server key cache count (i.e., the number of keys presently in the platform's pool for the user). At 1406, the device generates an appropriate number of keypairs (and reference values) and stores/transmits them in accordance with the techniques described above. Further, in the event the server key cache count is zero (i.e., the reserve key is being used by platform 102 due to key pool depletion), one of the newly generated keys will be designated by the server as a replacement reserve key and the old reserve key will be destroyed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising: an interface configured to:
receive a pool of public keys from a first device, wherein the pool has a first pool size that reflects a target number of keys to be included in the pool;
a processor configured to:
designate one of the received public keys included in the pool of public keys as a reserve key; and
select a public key from the pool of public keys for use in conjunction with encrypting a communication to the first device, wherein the selecting includes preferentially selecting a public key that is not designated as a reserve key when at least one such key is present in the pool in addition to the reserve key, and
select the reserve key for use in conjunction with encrypting the communication when the reserve key is the only key remaining in the pool without deleting the reserve key from the pool until the pool is replenished; and
a memory coupled to the processor and configured to provide the processor with instructions.

2. The system of claim 1 wherein the processor is further configured to delete the selected public key from the pool.

3. The system of claim 1 wherein the processor is further configured to transmit the selected public key to a second device.

4. The system of claim 1 wherein the first device is configured to generate a plurality of public-private keypairs, and wherein the first device is configured to retain the private keys included in the generated keypairs, and transmit the public keys as the pool.

5. The system of claim 1 wherein the processor is further configured to determine that the number of keys currently in the pool is below a threshold and to instruct the first device to transmit additional public keys to replenish the pool.

6. The system of claim 1 wherein the processor is further configured to determine whether the reserve key has been selected and, in response to a determination that the reserve key has been selected, set a flag indicating that the first device should be instructed to generate additional keys.

7. The system of claim 6 wherein the processor is further configured to delete the reserve key and to designate one of the additional keys as a new reserve key.

8. The system of claim 6 wherein the processor is further configured to increase the first pool size to a second pool size.

9. The system of claim 1 wherein the processor is further configured to increase the first pool size to a second pool size.

10. A method, comprising:
- receiving a pool of public keys from a first device, wherein the pool has a first pool size that reflects a target number of keys to be included in the pool;
- designating one of the received public keys included in the pool of keys as a reserve key; and
- selecting a public key from the pool of received public keys for use in conjunction with encrypting a communication to the first device, wherein the selecting includes preferentially selecting a public key that is not designated as a reserve key, if at least one such key is present in the pool in addition to the reserve key; and
- selecting the reserve key for use in conjunction with encrypting the communication when the reserve key is the only key remaining in the pool without deleting the reserve key from the pool until the pool is replenished.

11. The method of claim 10 further comprising deleting the selected public key from the pool.

12. The method of claim 10 further comprising transmitting the selected public key to a second device.

13. The method of claim 10 wherein the first device is configured to generate a plurality of public-private keypairs, and wherein the first device is configured to retain the private keys included in the generated keypairs, and transmit the public keys as the pool.

14. The method of claim 10 further comprising determining that the number of keys currently in the pool is below a threshold and instructing the first device to transmit additional public keys to replenish the pool.

15. The method of claim 10 further comprising determining whether the reserve key has been selected and, in response to a determination that the reserve key has been selected, setting a flag indicating that the first device should be instructed to generate additional keys.

16. The method of claim 15 further comprising deleting the reserve key and designating one of the additional keys as a new reserve key.

17. The method of claim 15 further comprising increasing the first pool size to a second pool size.

18. The method of claim 10 further comprising increasing the first pool size to a second pool size.

19. A computer program product, the computer program product being embodied in a non-transitory tangible computer readable storage medium and comprising computer instructions for:
- receiving a pool, having a first pool size, of public keys from a first device, wherein the pool size reflects a target number of keys to be included in the pool;
- designating one of the received public keys included in the pool of keys as a reserve key;
- selecting a public key from the pool of received public keys for use in conjunction with encrypting a communication to the first device, wherein the selecting includes preferentially selecting a public key that is not designated as a reserve key, if at least one such key is present in the pool in addition to the reserve key, and
- selecting the reserve key for use in conjunction with encrypting the communication when the reserve key is the only key remaining in the pool without deleting the reserve key from the pool until the pool is replenished.

\* \* \* \* \*